(12) United States Patent
Balfour (10) Patent No.: US 6,239,369 B1
(45) Date of Patent: May 29, 2001

(54) BRACKET ASSEMBLY FOR UTILITY ENCLOSURE

(75) Inventor: William J. Balfour, Winsted, CT (US)

(73) Assignee: Electric Motion Company, Inc., Winsted, CT (US)

( * ) Notice: Subject to any disclaimer, the term of this patent is extended or adjusted under 35 U.S.C. 154(b) by 0 days.

(21) Appl. No.: 09/398,544

(22) Filed: Sep. 17, 1999

(51) Int. Cl.$^7$ ........................................................ H01H 9/02
(52) U.S. Cl. .............................. 174/58; 174/63; 220/3.3; 248/906; 439/535
(58) Field of Search .................................. 174/50, 53, 58, 174/17 R, 63, 38, 60, 77 R; 220/3.2, 3.3, 3.9; 248/906; 439/535; D13/137

(56) References Cited

U.S. PATENT DOCUMENTS

| | | | |
|---|---|---|---|
| D. 367,464 | * | 2/1996 | Jones et al. ................. D13/137 X |
| D. 430,849 | * | 9/2000 | Leschinger et al. ............. D13/152 |
| 3,557,299 | * | 1/1971 | Dienes ............................ 174/38 |
| 3,848,074 | * | 11/1974 | Channell ....................... 174/77 R X |
| 4,243,834 | * | 1/1981 | Logioco ......................... 174/60 X |
| 4,542,437 | * | 9/1985 | Ellis et al. .................... 174/38 X |
| 5,210,374 | * | 5/1993 | Channell ....................... 174/38 |
| 5,308,923 | * | 5/1994 | Puigcerver et al. ............. 174/87 |
| 5,942,726 | * | 8/1999 | Reiker ........................... 174/58 |
| 6,008,452 | * | 12/1999 | Lux, Jr. ........................ 174/38 X |

FOREIGN PATENT DOCUMENTS

712668 * 6/1965 (CA) ................................. 174/58

* cited by examiner

*Primary Examiner*—Dean A. Reichard
*Assistant Examiner*—Dhiru R Patel
(74) *Attorney, Agent, or Firm*—Alix, Yale & Ristas, LLP (57) ABSTRACT

A bracket assembly for mounting a terminal housing in an utility enclosure which includes a base and a rotator arm. The base has a pair of laterally spaced side walls forming a gap for receiving the rotator arm. At least a part of the rear end portion of each base side wall may be mounted to the utility enclosure. The rotator arm has a longitudinally extending mounting member and first and second laterally spaced side walls which extend from the mounting member. The mounting member may be mounted to the terminal housing. Each arm side wall also has a mounting tab which extends outwardly into an opening in the adjacent base side wall to mount the rotator arm within the base such that the rotator arm may be rotated between an upright position and an inclined position. Each arm side wall has an outwardly extending locking tab which is received in a notch in the top portion of the adjacent base side wall to lock the rotator arm in the upright position. The mounting tabs engage the lower edge of the openings of the base side walls and the mounting member of the rotator arm engages wings which extend inwardly from the base side walls to support the rotator arm when the rotator arm is in the inclined position.

19 Claims, 7 Drawing Sheets

BRACKET ASSEMBLY FOR UTILITY ENCLOSURE

BACKGROUND OF THE INVENTION

This invention relates generally to devices for mounting a terminal housing in an electrical connection enclosure. More particularly, the present invention relates to mounting brackets for mounting a terminal housing in an underground utility enclosure, such as a splice box, a handhole, or a grade level box enclosure.

U.S. Pat. No. 5,210,374 discloses a terminal housing for buried communications lines having a waterproof housing. In one embodiment, the housing is mounted to the ground with a ground stake. In another embodiment, the housing is mounted to a wall bracket on an underground utility enclosure by a terminal bracket. The terminal bracket can be secured to an upper portion of the wall bracket in a temporary position until installation of the electrical connections are completed, after which the terminal bracket can be moved to a lower position and rigidly affixed in that position.

The patent does not disclose how the terminal bracket is moved from the upper position to the lower position. The commercial product which includes this terminal housing employs a rotating shaft to mount the terminal housing to the underground utility enclosure. The terminal housing is rotated to an upright, vertical position during the installation of the electrical connections. Splines on the shaft allow the terminal housing to be locked in the upright position. Upon completion of the electrical connection installation, the shaft is unlocked and the terminal housing is rotated to a substantially horizontal or inclined position. The shaft does not lock in the inclined position and therefore, the terminal housing rests on the ground surface disposed within the utility enclosure. It is likely that the spline locking mechanism of the shaft would be unable to support the terminal housing and the electrical connections contained therewithin due to the weight of the terminal housing, the cables, and electrical connectors and the moment arm that is formed between the terminal housing and the shaft. Contact between the terminal housing, the ground surface, and ground water results in mechanical and electrical deterioration of the terminal housing. In addition, the spline locking mechanism of the shaft is easily jammed by dirt.

SUMMARY OF THE INVENTION

Briefly stated, the invention in a preferred form is a bracket assembly for mounting a terminal housing in an utility enclosure which includes a base having first and second laterally spaced base side walls. Each of the side walls has a rear end portion, a front end portion, and a top portion. At least a part of each rear end portion may be mounted to the utility enclosure. The top portion of each base side wall has a downwardly extending notch and an inwardly extending wing and the front end portion of each base side wall has an opening. A rotator arm is disposed within the gap formed between the first and second base side walls. The rotator arm has a longitudinally extending mounting member and first and second laterally spaced arm side walls which extend from the mounting member. The mounting member may be mounted to the terminal housing. Each arm side wall has an outwardly extending locking tab. Each arm side wall also has a mounting tab which extends outwardly into the opening of the adjacent base side walls to mount the rotator arm within the base such that the rotator arm may be rotated between an upright position and a substantially horizontal or inclined position. The locking tabs of the arm side walls are received in the notches of the base side walls when the rotator arm is in the upright position to lock the rotator arm in the upright position. The mounting tabs engage the lower edge of the openings of the base side walls and the mounting member of the rotator arm engages the wings of the base side walls to support the rotator arm when the rotator arm is in the inclined position.

In one preferred embodiment, the locking tabs extend outwardly from a front end portion of the arm side walls, the mounting tabs extend outwardly from a bottom portion of the arm side walls, and each of the wings is positioned in the top portion of the base side wall. Preferably, the openings of the base side walls each have an upper portion and a lower portion. The width of the upper portion is greater than the width of the lower portion, forming a shoulder defining the lower edge of the opening. The thickness of each mounting tab is less than the width of the lower portion of the openings such that at least a portion of each mounting tab is received in the lower portion of the opening when the rotator arm is in the upright position.

It is an object of the invention to provide a new and improved bracket assembly for mounting a terminal housing within a utility enclosure.

It is also an object of the invention to provide a bracket assembly which supports a terminal housing mounted within a utility enclosure in an inclined position and which locks the terminal housing in an upright position for the installation of electrical connections.

It is further an object of the invention to provide a bracket assembly for mounting a terminal housing within a utility enclosure which is inexpensive to manufacture and install.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENTS

Figure 1:
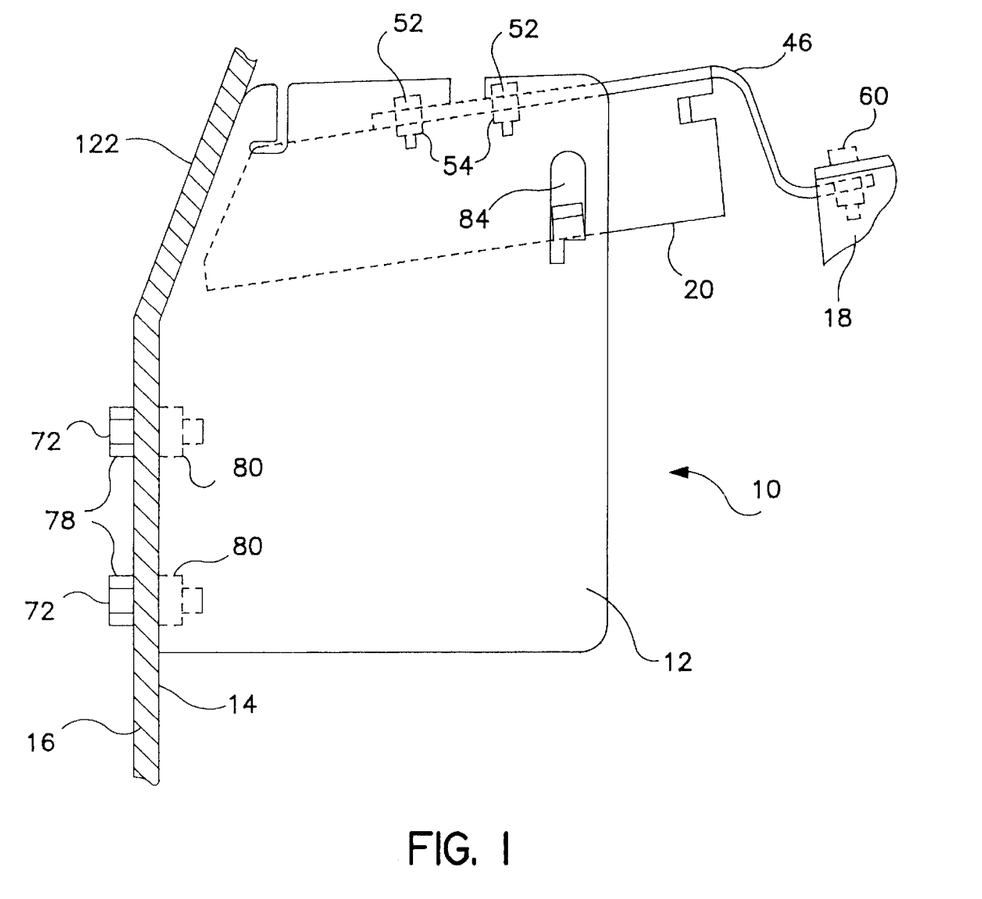
FIG. 1 is a side view, partly in cross-section, partly in phantom, and partly broken away of a terminal housing mounted to an utility enclosure by a bracket assembly in accordance with the invention, showing the bracket assembly in the inclined position.

With reference to the drawings wherein like numerals represent like parts throughout the several figures, a bracket assembly in accordance with the present invention is generally designated by the numeral 10. As shown in FIG. 1, the bracket assembly 10 includes a base 12 which is fixedly mounted to an interior surface 14 of the utility enclosure 16. A terminal housing 18 is mounted to the base 12 via a rotator arm 20 which is normally in a horizontal or inclined position, such that the weight of the terminal housing 18, cables (not shown), and connectors (not shown) is fully supported by the bracket assembly 10 and the utility enclosure 16. The rotator arm 20 may be rotated approximately 90° and locked in an upright, substantially vertical position (FIG. 2) during installation of the electrical connections in the terminal housing 18.

Figure 7:
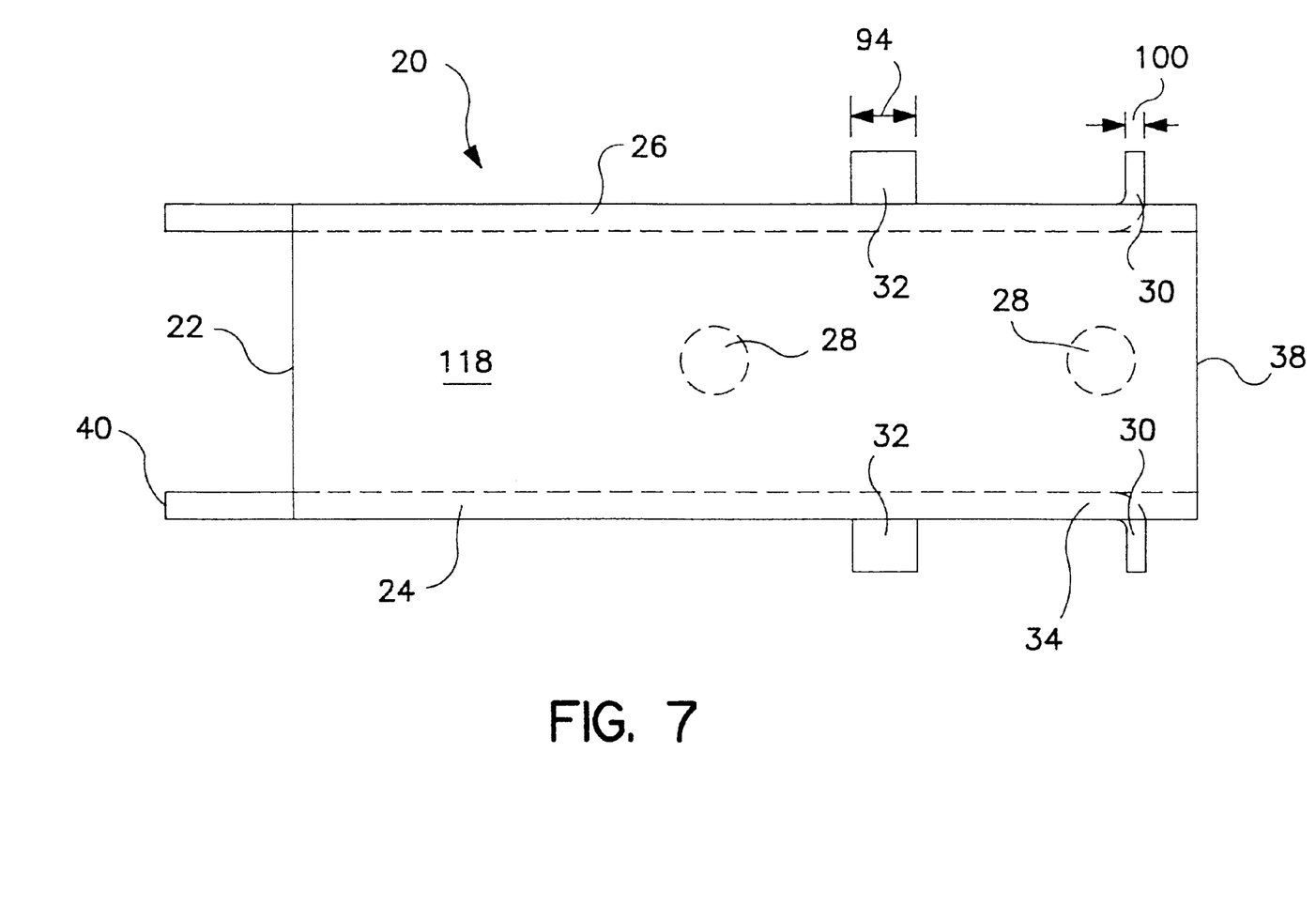
FIG. 7 is an enlarged top view, partly in phantom, of the rotator arm of the bracket assembly of FIG. 1.
Figure 8:
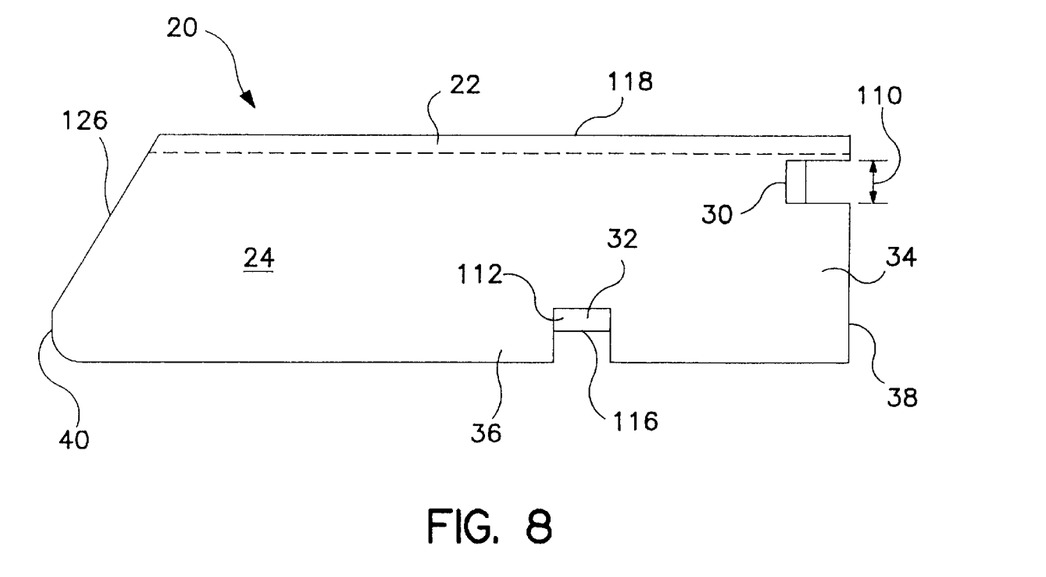
FIG. 8 is a side view of the rotator arm of FIG. 7.
Figure 9:
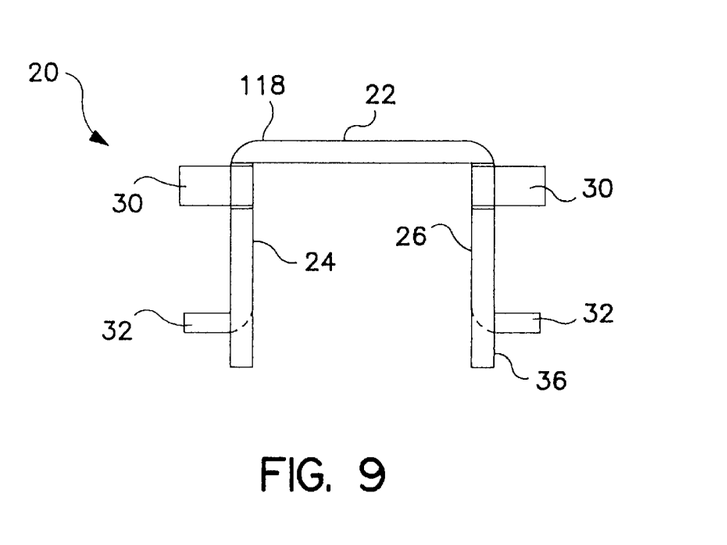
FIG. 9 is a front view of the rotator arm of FIG. 7.

With reference to FIGS. 7, 8 and 9, the rotator arm 20 has an inverted U-shape comprising a longitudinally extending mounting member 22 and a pair of laterally extending side walls 24, 26. The mounting member 22 includes a pair of longitudinally spaced, threaded openings 28. Each side wall 24, 26 includes a locking tab 30 and a mounting tab 32 that extend outwardly from the side wall 24, 26. Each locking tab 30 is disposed in the front end portion 34 of a respective side wall 24, 26, adjacent the mounting member 22. Each mounting tab 32 is disposed in the bottom portion 36 of a respective side wall 24, 26, intermediate the front and rear ends 38, 40. The distance between the rear end 40 of the rotator arm 20 and the mounting tabs 32 is selected such that when the rotator arm 20 is in the inclined position, the rear end 40 of the rotator arm 20 does not engage the rear wall 42 of the base 12 or does not extend rearwardly of the rear end 44 of the base 12 (where the base 12 includes only a partial rear wall 42, as shown in FIGS. 4 and 5).

Figure 3:
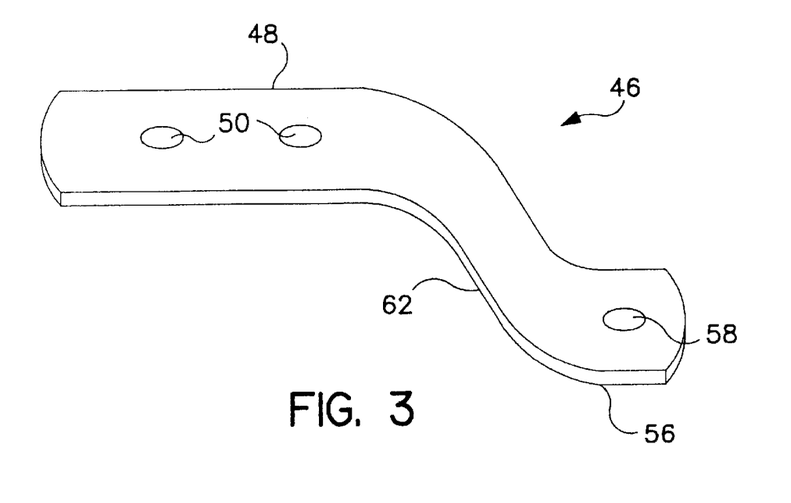
FIG. 3 is a side perspective view of the connector arm of the bracket assembly of FIG. 1.

With reference to FIGS. 1 and 3, the terminal housing 18 is connected to the rotator arm 20 via a connector arm 46. The connector arm 46 includes an upper bracket-mounting portion 48 having a pair of longitudinally spaced openings 50 which cooperate with openings 28 of the mounting member 22. The threaded shafts of a pair of bolts 52 extend through openings 50 and openings 28. The heads of the bolts 52 and a pair of nuts 54 clamp the mounting member 22 and the bracket-mounting portion 48 therebetween. A lower housing-mounting portion 56 has a single opening 58 for receiving the threaded shaft of a bolt 60 for mounting the housing-mounting portion 56 to the terminal housing 18. A vertically and horizontally extending intermediate portion 62 connects the bracket-mounting portion 48 to the housing-mounting portion 56.

Figure 4:
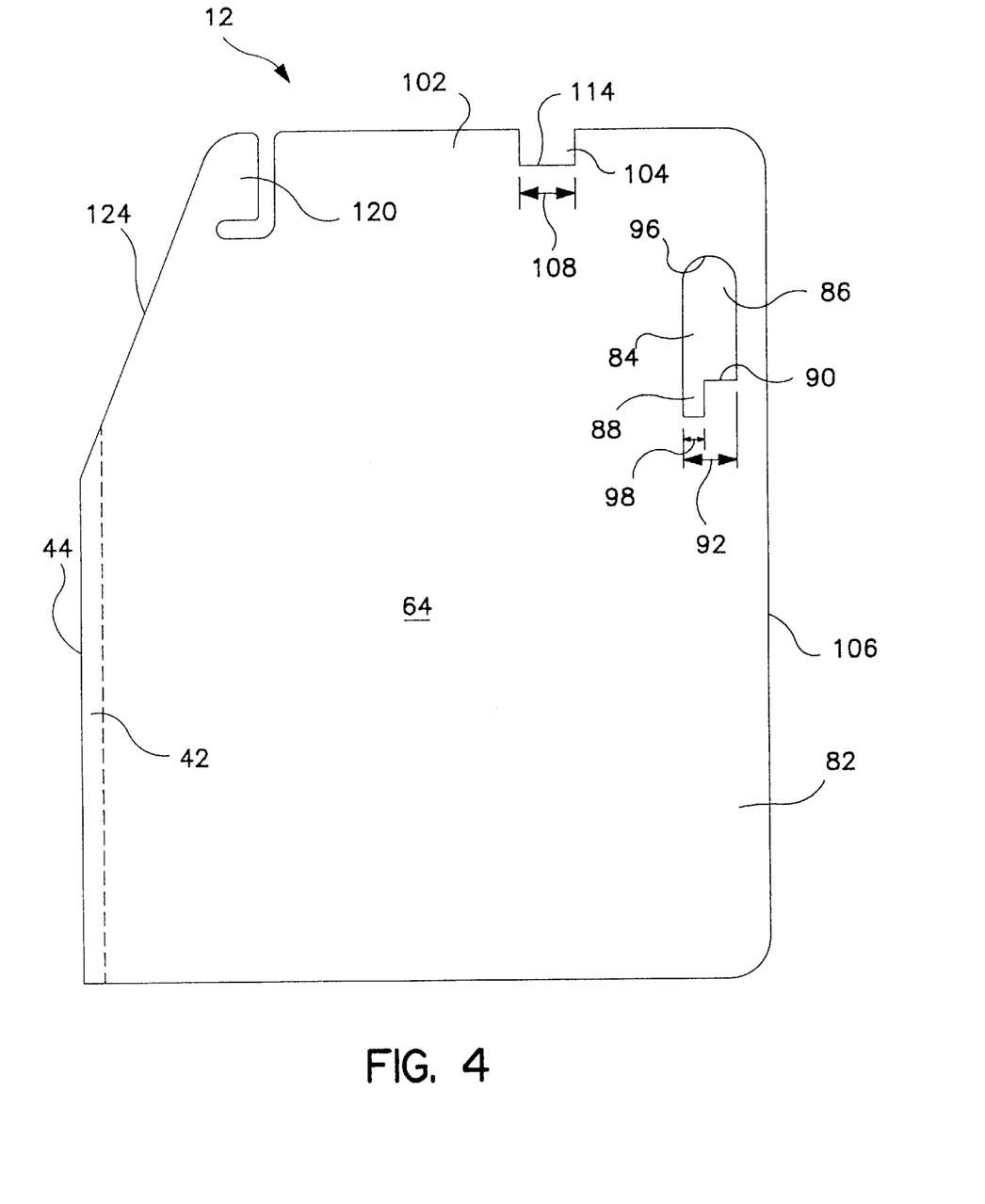
FIG. 4 is an enlarged side view, partly in phantom, of the base of the bracket assembly of FIG. 1.
Figure 5:
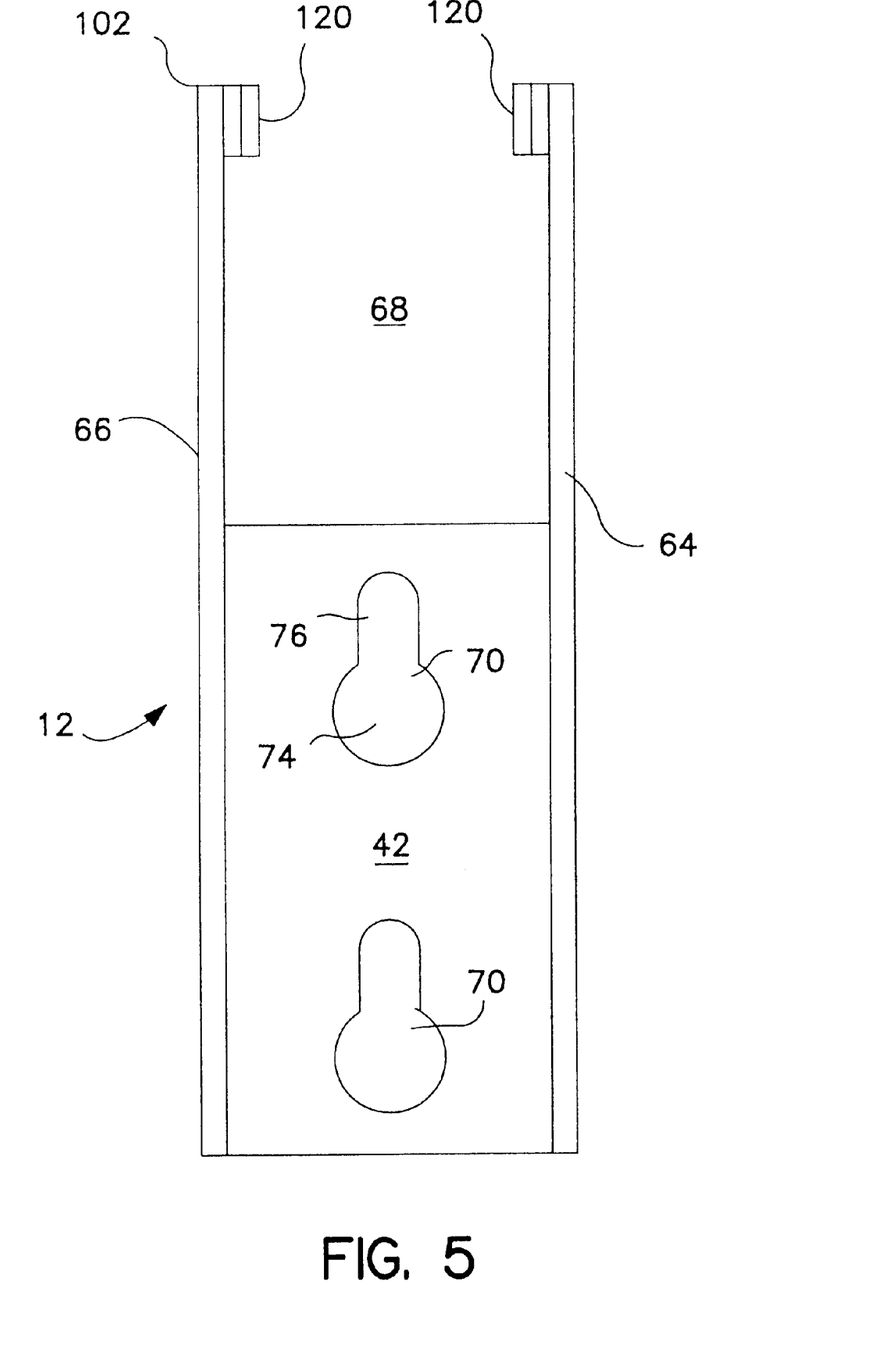
FIG. 5 is a rear view of the base of FIG. 4.
Figure 6:
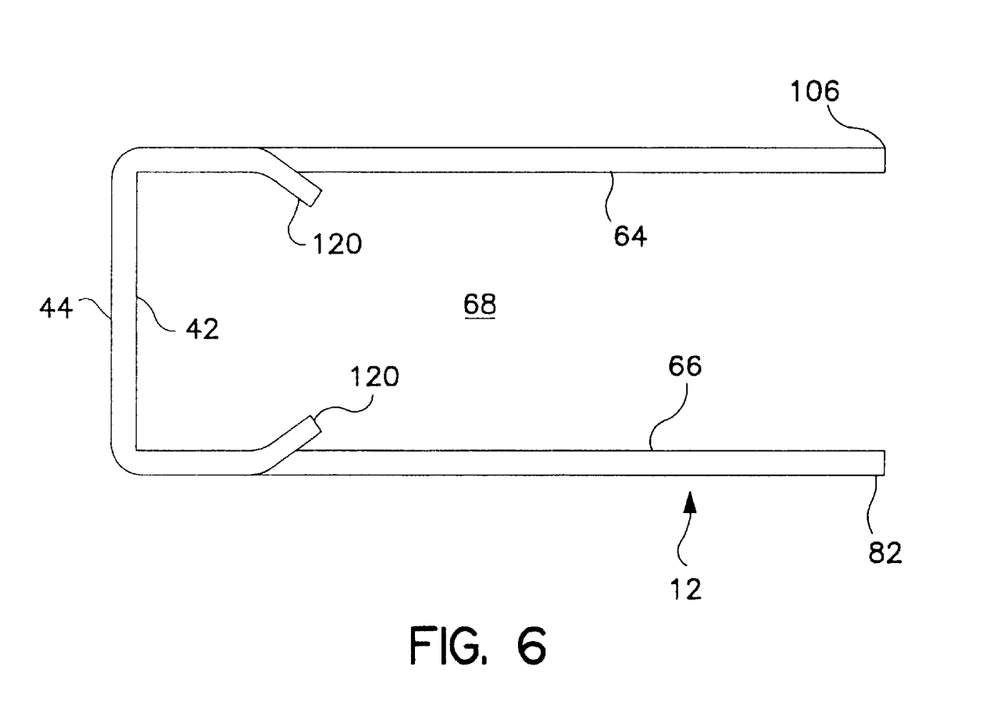
FIG. 6 is a bottom view of the base of FIG. 4.

With reference to FIGS. 4, 5 and 6, the base 12 includes a pair of side walls 64, 66 which are connected by a laterally extending rear wall 42. The side walls 64, 66 are laterally spaced to define a gap 68 therebetween. The rear wall 42 of the base 12 includes two openings 70 for receiving bolts 72 for mounting the base 12 to the utility enclosure 16. In a preferred embodiment, each opening 70 has a lower section 74 and an upper section 76 where the diameter of the lower section 74 is larger than the diameter of the upper section 76. The diameter of the lower section 74 is selected such that the bolt head 78 or the nut 80 may be inserted through the lower section 74. The diameter of the upper section 76 is selected such that the bolt shaft will pass through the upper section but not the bolt head 78 or the nut 80. The base 12 is mounted to the utility enclosure 16 by loosely threading the nuts 80 onto the bolt shafts, inserting the nuts/bolt heads through the lower sections 74 of the openings 70, and lowering the base 12 such that the bolt shafts slide into the upper sections 76 of the openings. The nuts 80 are then tightened to lock the base 12 to the utility enclosure 16.

The front end portion 82 of each side wall 64, 66 includes an opening 84 for receiving a corresponding mounting tab 32 of the rotator arm 20, such that the rotator arm 20 is mounted in the gap 68 between the base side walls 64, 66 by the mounting tabs 32. The opening 84 includes an upper portion 86, a lower portion 88 extending downwardly from the upper portion 86, and a shoulder 90 formed by the bottom edge of the upper portion 86. The width 92 of the upper portion 86 is greater than the width 94 of the mounting tab 32 (FIG. 7) such that the mounting tab 32 may be rotated within the upper portion 86 of the opening 84. The top edge 96 of the upper portion 86 has a semicircular shape that facilitates rotation of the mounting tab 32 within the upper portion 86 of the opening 84. The width 98 of the lower portion 88 of the opening 84 is slightly larger than the thickness 100 of the mounting tab 32 (FIG. 7). The top portion 102 of each side wall 64, 66 of the base 12 includes a downwardly extending notch 104 disposed intermediate the front and rear ends 106, 44. The width 108 of the notch 104 is greater than the height 110 of the locking tab 30 of the rotator arm 20 (FIG. 8).

Figure 2:
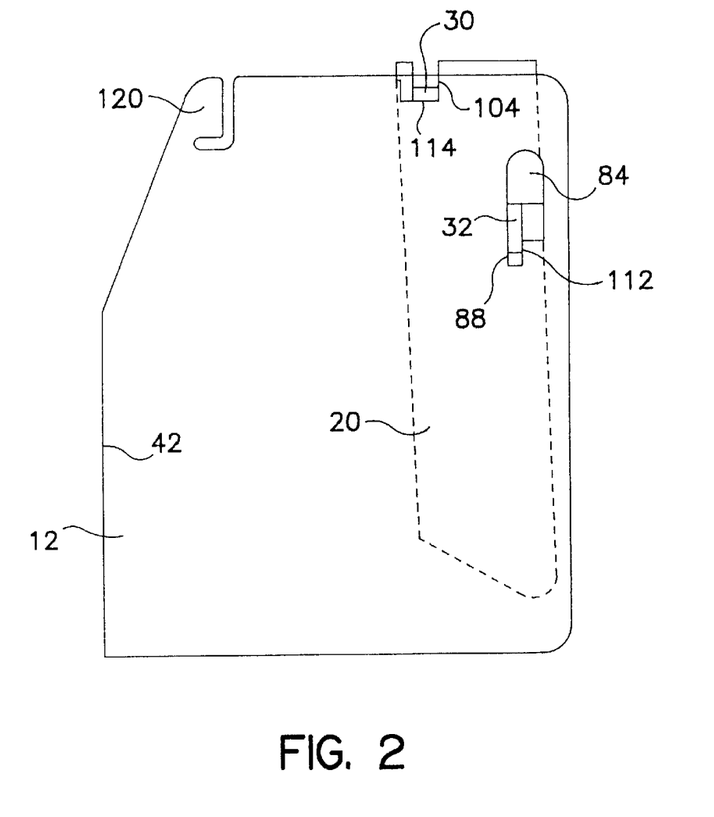
FIG. 2 is a side view, partly in phantom, of the base and the rotator arm of the bracket assembly of FIG. 1 in the upright position.

When the rotator arm 20 is in the upright position, the locking tab 30 is received in notch 104 to lock the rotator arm 20 in the upright position (FIG. 2). In a preferred embodiment, a rear portion 112 of the mounting tab 32 is received within the lower portion 88 of opening 84 to further lock the rotator arm 20 in the upright position. The locking tab 30 engages the lower surface 114 of the notch 104 to support the weight of the rotator arm 20, connector arm 46, terminal housing 18, and electrical connections when the rotator arm 20 is in the upright position. The rotator arm 20 is unlocked by lifting the terminal housing 18 until the rear portion 112 of the mounting tab 32 and the locking tab 30 are removed from lower portion 88 and notch 104, respectively.

The bracket assembly 10 relies on the weight of the rotator arm 20, connector arm 46, terminal housing 18, and electrical connections to hold the rotator arm 20 in the inclined position. The bottom face 116 of the mounting tabs 32 (FIG. 8) rest on the shoulder 90 of the upper portion 86 of opening 84 and the upper surface 118 of the mounting member 22 engages a wing 120 which extends from the inner surface of each side wall 64, 66 of the base 12. Openings 84 are positioned adjacent the front end 106 of the side wall 64, 66 and wings 120 are positioned adjacent the rear end 44 of the side wall 64, 66 to provide the maximum moment arm for supporting the weight of the rotator arm 20, connector arm 46, terminal housing 18, and electrical connections when the rotator arm 20 is in the inclined position.

Some utility enclosures 16 have an upper rim portion 122 that tapers inwardly (FIG. 1). With further reference to FIGS. 4 and 8, a portion 124 of the rear end 44 of the base 12 and a portion 126 of the rear end 40 of the rotator arm 20 may extend upwardly and forwardly to form a slope which conforms to the slope of upper rim portion 122.

In a preferred embodiment, the base 12, rotator arm 20, and the connector arm 46 may each be formed in a simple stamping operation. During the stamping operation, the openings 28, 50, 70, 84, tabs 30, 32, notch 104 and wings 120 described above are formed. For example, the locking tabs 30 are formed by removing material from the front end portion 34 of side walls 24, 26 at a first location adjacent the mounting member 22 and a second location vertically spaced from the first location and bending the segment of the sidewall disposed intermediate the first and second locations outward. Similarly the mounting tabs 32 are formed by removing material from the bottom portion 36 of side walls 24, 26 at third and fourth longitudinally spaced locations and bending the segment of the side wall disposed intermediate the third and fourth locations outward. The wings 120 may be formed by cutting an L-shaped slot extending downwardly from the upper edge of each side wall and bending the wing 120 formed by the slot inward into the gap 68 between the side walls 64, 66. It should be appreciated that this method of production is relatively inexpensive. In addition, the bracket assembly 10 is easily and inexpensively installed.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A bracket assembly for mounting a terminal housing within a utility enclosure comprising:
    a base having a vertically extending rear end wall, a pair of base side walls extending forward from the rear end wall and defining a gap therebetween, at least one engagement member extending into the gap and at least one locking member, the rear end wall being mountable within the utility enclosure, each of the base side walls having a front end portion defining an opening having a lower edge; and
    a rotator arm disposed within the gap between the base side walls, the rotator arm having a longitudinally extending mounting member, at least one locking member, and an arm side wall member extending laterally from the mounting member, the mounting member being mountable to the terminal housing, the arm side wall member having oppositely disposed first and second surfaces disposed adjacent the base side walls, a first mounting tab extending from the first surface and a second mounting tab extending from the second surface, the first and second mounting tabs extending into the openings of the base side walls whereby the rotator arm is rotatably mounted within the base;
    wherein the rotator arm is rotatable between an upright position and an inclined position, the at least one locking member of the rotator arm engaging the at least one locking member of the base side walls when the rotator arm is in the upright position to lock the rotator arm in the upright position, the first and second mounting tabs engaging the lower edge of the openings of the base side walls and the mounting member of the rotator arm engaging the at least one engagement member of the base to support the rotator arm when the rotator arm is in the inclined position.

2. The bracket assembly of claim 1 each of the base side walls further has a top portion defining a downwardly extending notch, each notch having oppositely disposed side edges forming said at least one locking member of the base.

3. The bracket assembly of claim 2 wherein the arm side wall member comprises first and second arm side walls including the first and second surfaces of the arm side wall member, respectively, each of the arm side walls having a front end portion and a locking tab extending outwardly from the front end portion, the locking tab forming a locking member of the rotator arm.

4. The bracket assembly of claim 3 wherein each arm side wall further has a bottom portion, the first and second mounting tabs extending outwardly from the bottom portion of the first and second arm side walls, respectively.

5. The bracket assembly of claim 3 wherein each of the notches of the base side walls has a lower surface, the locking tabs of the arm side wall member engaging the lower surface of notches of the base side walls to support the rotator arm when the rotator arm is in the upright position.

6. The bracket assembly of claim 1 further comprising a connector arm having a bracket-mounting portion mounted to the mounting member of the rotator arm and a housing-mounting portion adapted for mounting to the terminal housing.

7. The bracket assembly of claim 6 further comprising first and second fasteners, the mounting member of the rotator arm and the bracket-mounting portion of the connector arm each defining first and second complementary openings, the first and second fasteners extending through the first and second openings of the mounting member and the bracket-mounting portion to mount the connector arm to the rotator arm.

8. The bracket assembly of claim 1 wherein each of the openings of the base side walls has an upper portion and a lower portion, the upper portion and lower portion each having a width, the width of the upper portion being greater than the width of the lower portion, the upper and lower portions forming a shoulder defining the lower edge of the opening of the base side wall.

9. The bracket assembly of claim 8 wherein each of the mounting tabs has a width, the width of the upper portion of each opening of the base side walls being greater than the width of the mounting tabs.

10. The bracket assembly of claim 9 wherein the mounting tabs each has a thickness, the thickness of the mounting tabs being less than the width of the mounting tabs and less than the width of the lower portion, wherein at least a portion of each mounting tab is received in the lower portion when the rotator arm is in the upright position.

11. The bracket assembly of claim 9 wherein each of the upper portions has an upper edge having a semi-circular shape.

12. The bracket assembly of claim 1 wherein each of the base side walls further has a wing extending into the gap between the base side walls, the wings defining the engagement member of the base.

13. The bracket assembly of claim 12 wherein each of the wings is positioned in the top portion of the base side wall adjacent the rear end wall.

14. A bracket assembly for mounting a terminal housing within a utility enclosure comprising:
    a base which is mountable to the utility enclosure having first and second laterally spaced base side walls defining a gap therebetween, each of the side walls having a front end portion and a top portion, the top portion of each base side wall defining a downwardly extending notch and having a wing extending inwardly into the gap, the front end portion of each base side wall defining an opening having a lower edge; and
    a rotator arm disposed within the gap between the first and second base side walls, the rotator arm having a longitudinally extending mounting member and first and second laterally spaced arm side walls extending from the mounting member, the mounting member being adapted for mounting to the terminal housing, each arm side wall having an outwardly extending locking tab and an outwardly extending mounting tab, the mounting tabs of the first and second arm side walls extending into the openings of the first and second base side walls, respectively, whereby the rotator arm is rotatably mounted within the base;
    wherein the rotator arm is rotatable between an upright position and an inclined position, the locking tabs of the first and second arm side walls being received in the notches of the first and second base side walls, respectively, when the rotator arm is in the upright position to lock the rotator arm in the upright position, the mounting tabs engaging the lower edge of the openings of the first and second base side walls and the mounting member of the rotator arm engaging the wings of the first and second base side walls to support the rotator arm when the rotator arm is in the inclined position.

15. The bracket assembly of claim 14 wherein each of the arm side walls further has a front end portion and a bottom portion, the locking tab extending outwardly from the front end portion, and the mounting tab extending outwardly from the bottom portion.

16. The bracket assembly of claim 14 wherein each of the openings of the base side walls has an upper portion and a lower portion, the upper portion and lower portion each having a width, the width of the upper portion being greater than the width of the lower portion, the upper and lower portions forming a shoulder defining the lower edge of the opening.

17. The bracket assembly of claim 16 wherein at least a portion of each mounting tab is received in the lower portion of the opening when the rotator arm is in the upright position.

18. The bracket assembly of claim 14 wherein each of the wings is positioned in the top portion of the base side wall.

19. A bracket assembly for mounting a terminal housing within a utility enclosure comprising:

a base having a vertically extending rear end wall, a pair of base side walls extending forward from the rear end wall and defining a gap therebetween, and at least one engagement member extending into the gap, the rear end wall being adapted for mounting within the utility enclosure, each of the base side walls having a front end portion and a top portion, the top portion of each base side wall defining a downwardly extending notch, the front end portion of each base side wall defining an opening having a lower edge; and a rotator arm disposed within the gap, the rotator arm having a longitudinally extending mounting member, a pair of arm side walls extending laterally from the mounting member, the mounting member being adapted for mounting to the terminal housing, each arm side wall having a first and second outwardly extending tabs, the second tabs extending into the openings of the base side walls whereby the rotator arm is rotatably mounted within the base;

wherein the rotator arm is rotatable between an upright position and an inclined position, the first tabs of the rotator arm being received in the notches of the base side walls when the rotator arm is in the upright position to lock the rotator arm in the upright position, the second tabs engaging the lower edge of the openings of the base side walls and the mounting member of the rotator arm engaging the engagement member of the base to support the rotator arm when the rotator arm is in the inclined position.

* * * * *